(12) United States Patent
Schwartz et al.

(10) Patent No.: US 10,731,768 B2
(45) Date of Patent: Aug. 4, 2020

(54) SYSTEMS AND METHODS FOR MANIFOLD VALVES (71) Applicant: Ecolab USA Inc., St. Paul, MN (US)

(72) Inventors: Daniel R. Schwartz, Cottage Grove, MN (US); Ryan J. Drake, White Bear Lake, MN (US)

(73) Assignee: Ecolab USA Inc., Saint Paul, MN (US)

(*) Notice: Subject to any disclaimer, the term of this patent is extended or adjusted under 35 U.S.C. 154(b) by 640 days.

(21) Appl. No.: 15/291,661

(22) Filed: Oct. 12, 2016

(65) Prior Publication Data
US 2018/0100597 A1 Apr. 12, 2018

(51) Int. Cl.
*F16K 27/00* (2006.01)
*B65B 3/04* (2006.01)
*B67D 7/02* (2010.01)
*B67D 7/74* (2010.01)
*B67D 7/78* (2010.01)
*F16L 29/00* (2006.01)
*F16L 41/02* (2006.01)

(52) U.S. Cl.
CPC .............. *F16K 27/003* (2013.01); *B65B 3/04* (2013.01); *B67D 7/0294* (2013.01); *B67D 7/74* (2013.01); *B67D 7/78* (2013.01); *B67D 2210/0006* (2013.01); *F16L 29/002* (2013.01); *F16L 41/021* (2013.01)

(58) Field of Classification Search
CPC ........ F16K 35/02; F16K 35/14; F16K 27/003; F16K 11/22; B67D 2210/0006; F16L 37/242; F16L 37/24; F16L 37/107
USPC ............................................ 137/884; 141/244
See application file for complete search history.

(56) References Cited

U.S. PATENT DOCUMENTS 3,934,605 A 1/1976 Legris
4,181,143 A 1/1980 Fallon
4,782,852 A * 11/1988 Legris .................. F16L 37/252
137/269

(Continued)

FOREIGN PATENT DOCUMENTS

EP 1045209 B1 7/2003
WO 2008016352 A1 2/2008
WO 2015140162 A1 9/2015

OTHER PUBLICATIONS

International Patent Application No. PCT/US2017/055603, International Search Report and Written Opinion dated Feb. 23, 2018, 21 pages.

*Primary Examiner* — Timothy P. Kelly
(74) *Attorney, Agent, or Firm* — Fredrikson & Byron, P.A.

(57) ABSTRACT

A fluid dispenser system is disclosed that can have a plurality of dispensers, each having a valve. Each valve can be connectable in series with another valve. The dispenser system can include a manifold permitting passage of a common fluid therethrough. Any of the valves connected to two adjacent valves can be removable without removing either of the valves to which it is connected. The common fluid can have a fluid pressure associated therewith. The fluid pressure can generate a tension force for pushing two adjacent valves apart and thereby lock the valves into a series connection. A method of removing a valve from a series of valves comprises stopping flow of the common fluid through the manifold, thereby releasing the tension force. The valve intended to be removed can be rotated, and thus removed with respect to the valve intended to be left in the series connection.

11 Claims, 7 Drawing Sheets

(56) References Cited

U.S. PATENT DOCUMENTS

| | | |
|---|---|---|
| 6,131,881 A | 10/2000 | Preisser |
| 6,367,507 B1 | 4/2002 | Legeai |
| 6,474,700 B2 | 11/2002 | Redemann et al. |
| 6,789,708 B2 | 9/2004 | Hansen |
| 7,194,911 B2 | 3/2007 | Bordonaro et al. |
| 7,261,121 B2 | 8/2007 | Bordonaro et al. |
| 7,467,640 B2 | 12/2008 | Bordonaro et al. |
| 8,141,915 B2 * | 3/2012 | Hall .................... F15B 13/0821 285/203 |
| 9,234,616 B2 | 1/2016 | Carrez et al. |
| 2006/0278272 A1 * | 12/2006 | Bordonaro ............ F16K 27/003 137/269 |
| 2007/0108399 A1 | 5/2007 | Holtwick et al. |
| 2009/0090415 A1 | 4/2009 | Harris et al. |

* cited by examiner

SYSTEMS AND METHODS FOR MANIFOLD VALVES

BACKGROUND

Fluid dispenser systems can be useful for filling spray bottles, mop buckets or other suitable containers with a diluted product. Some such example dispenser systems include Oasis® dispenser systems commercially available from the assignee of the present application, Ecolab Inc., Saint Paul, Minn. Further, some such example dispenser systems are described in the commonly-assigned U.S. Pat. No. 6,789,708 B2, the disclosure of which is hereby incorporated by reference in its entirety. Such dispenser systems comprise a series of dispensers, each having a valve and/or an aspirator for dispensing one or more products.

Presently-known fluid dispenser systems include valves that are connected in series using fluid fittings that permit connecting or disconnecting the series valves in sequence. In such cases, if one of the valves in the series is defective, and is connected to two adjacent valves, removal and replacement of the defective valve would involve disconnecting and re-connecting at least the two valves to which the defective valve is connected. Such systems and methods can be time consuming for the user, as a result of which the user discards the entire dispenser system, including components that are fully operational.

SUMMARY

In general, this disclosure is directed to a fluid dispenser system. In one aspect, the fluid dispenser system can have a plurality of dispensers, each having a valve and configured to dispense a fluid. Each valve can be connectable in series with another valve to form a series connection. The dispenser system can also include a manifold permitting passage of a common fluid therethrough when the valves are connected in series with each other. In some such examples, any of the valves connected to two adjacent valves can be removable without removing either of the valves to which it is connected.

In another aspect, the common fluid can have a fluid pressure associated therewith when flowing through the manifold. The fluid pressure can be configured to generate a tension force for pushing two adjacent valves apart. The tension force can be of a sufficient magnitude to lock the valves into a series connection.

In another aspect, a method of installing a series of valves, comprises the step of providing a series valve assembly according to any of the embodiments disclosed herein. In some such examples, the valve assembly comprises a first valve and a second valve, each of which have an inlet port, a body portion and an outlet port. The valve assembly has a manifold comprising the inlet port, the body portion and the outlet port of each of the first valve and the second valve. A common fluid flows through the manifold when the first valve and the second valve are connected with each other. The method of installing the valves into a series connection may comprise the step of connecting the outlet port of the first valve with the inlet port of the second valve. The common fluid may be supplied through the manifold which has a fluid pressure associated therewith when flowing through the manifold. A tension force associated with the fluid pressure can be generated. The tension force would push the first valve and the second valve apart and thereby lock them into a series connection.

In another aspect, a method of removing a valve from a series of valves comprises the step of stopping flow of the common fluid through the manifold, thereby releasing the tension force associated with the fluid pressure that pushes the first valve and the second valve apart. The first valve and the second valve can then be compressed toward each other. The valve intended to be removed can be rotated with respect to the valve intended to be left in the series connection, and thereby removing the connection between the first valve and the second valve.

The details of one or more examples are set forth in the accompanying drawings and the description below. Other features, objects, and advantages will be apparent from the description and drawings, and from the claims.

DETAILED DESCRIPTION

Figure 1:
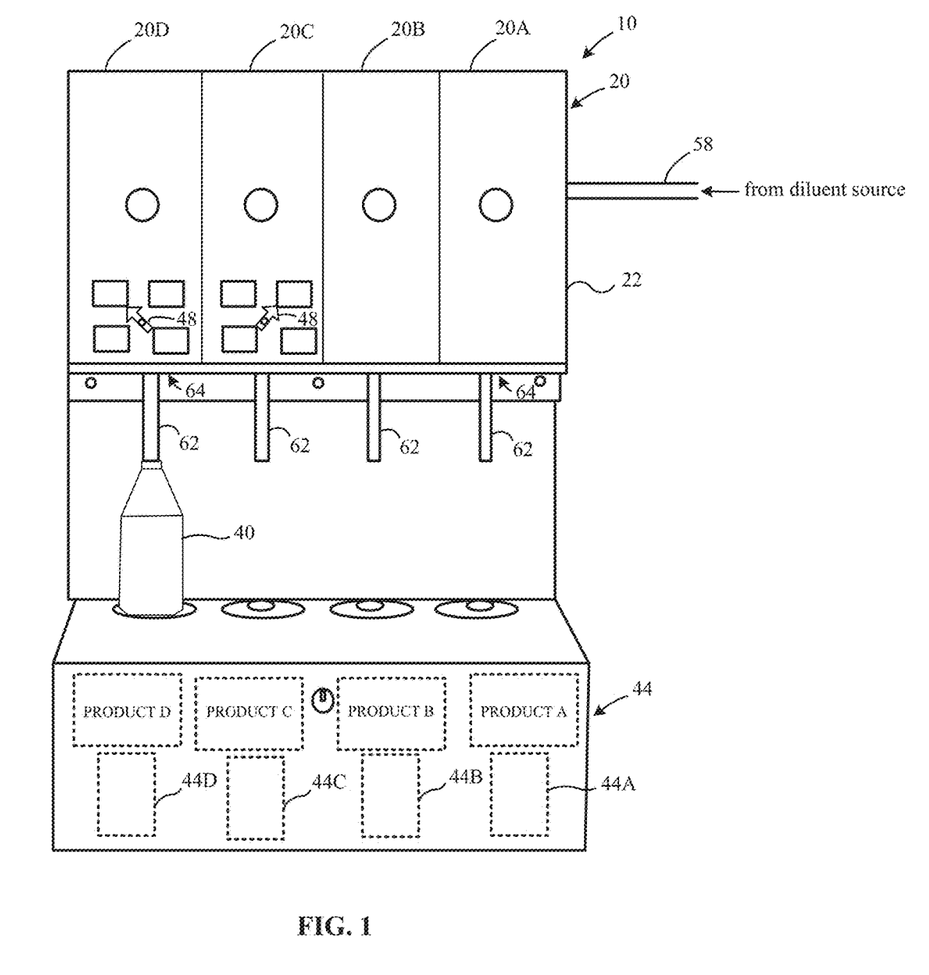
FIG. 1 is a front view of a dispenser system according to an exemplary embodiment.
Figure 2:
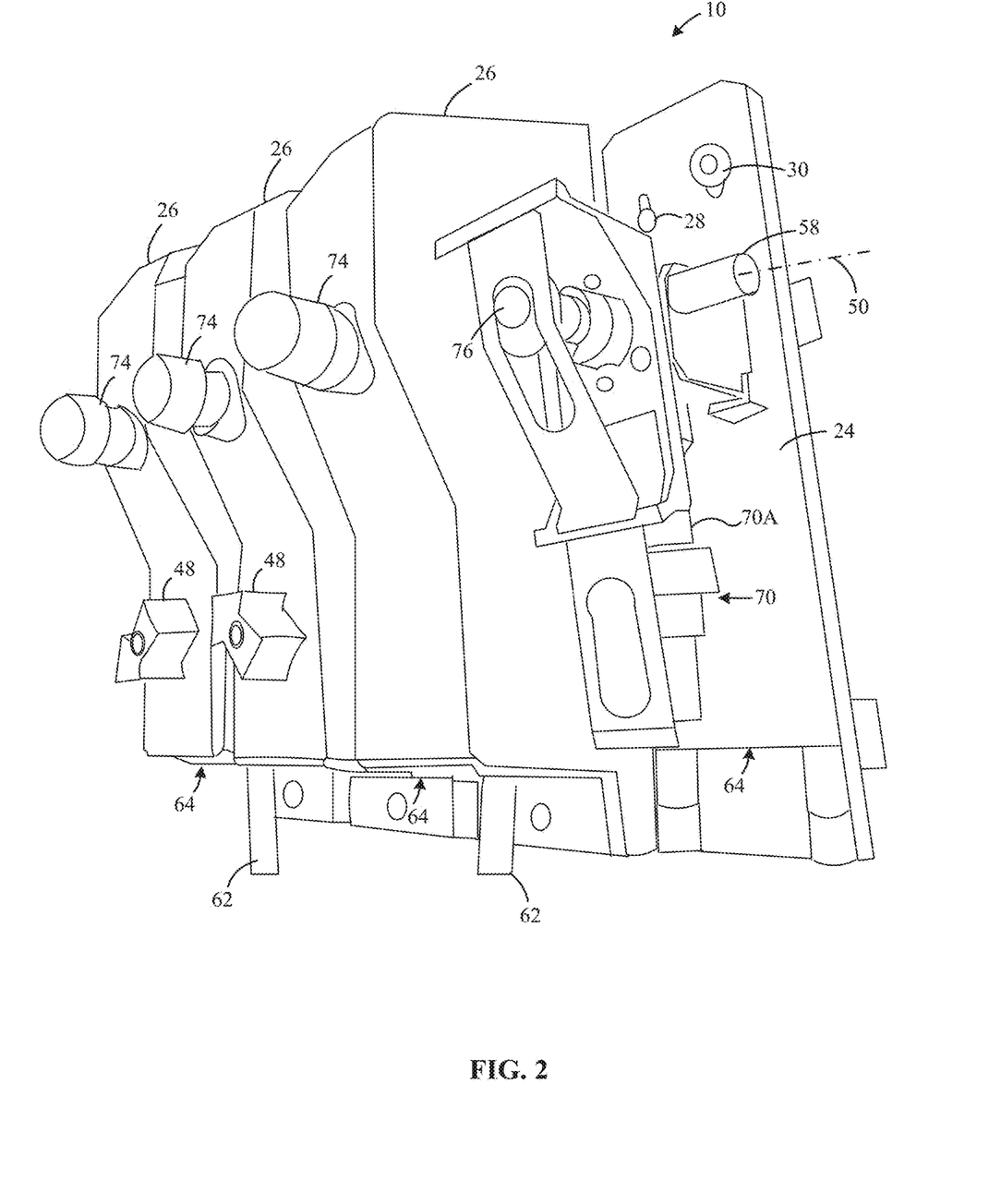
FIG. 2 is an enlarged side view of a portion of the dispenser system of FIG. 1, with a cover removed from one of the dispensers to illustrate internal detail.

FIGS. 1 and 2 illustrate a dispenser system 10 according to an exemplary embodiment. Such dispenser systems can be useful for filling spray bottles, mop buckets or other suitable containers with a diluted product. Some such example dispenser systems include Oasis® dispenser systems commercially available from the assignee of the present application, Ecolab Inc., Saint Paul, Minn. Further, some such example dispenser systems are described in the commonly-assigned U.S. Pat. No. 6,789,708 B2, the disclosure of which is hereby incorporated by reference in its entirety.

With continued reference to FIGS. 1 and 2, the dispenser system 10 includes a plurality of individual dispensers 20. In the illustrated embodiments, four dispensers 20A, 20B, 20C and 20D are provided, though, additional or fewer dispensers are contemplated within the scope of the present disclosure. Each dispenser has a housing 22 with a base 24 and a cover 26. The base 24 provides a mounting surface for mounting the dispenser to a surface such as a wall (e.g., using mounting interfaces 28 and fasteners 30) and for operatively connecting other components of the dispenser. The cover 26 can engage the base 24 and enclose other components of the dispenser.

In one example, the dispenser system 10 acts as an aspirator to dilute a concentrated product with a diluent to form a use solution. The use solution can be dispensed into a solution container 40, such as the spray bottle illustrated in FIG. 1. In such examples, the dispenser system 10 includes one or more concentrated product reservoirs 44. In the illustrated embodiment, each dispenser is fluidly connectable to a concentrated product reservoir 44. For instance, a first dispenser 20A can be fluidly connectable to a first reservoir 44A comprising a first concentrated product, a second dispenser 20B can be fluidly connectable to a second reservoir 44B comprising a second concentrated product, a third dispenser 20C can be fluidly connectable to a third reservoir 44C comprising a third concentrated product, and a fourth dispenser 20D can be fluidly connectable to a fourth reservoir 44D comprising a fourth concentrated product.

In some embodiments, each of the first concentrated product, second concentrated product, third concentrated product and fourth concentrated product may be substantially identical. Alternatively, each of the first concentrated product, second concentrated product, third concentrated product and fourth concentrated product may be substantially different (e.g., different chemicals, or identical chemicals of different concentrations). The concentrated product can be cleaning chemicals, fragrances, floor cleaners, glass cleaners, peracids or sanitizers.

Advantageously, each dispenser may also be fluidly connectable to more than one reservoir. For instance, as seen in FIGS. 1 and 2, the first dispenser 20A and the second dispenser 20B may each be connectable to a single reservoir 44A and 44B respectively, whereas the third dispenser 20C and the fourth dispenser 20D may each be connectable to four reservoirs comprising four concentrated products. A product selector 48 may be provided on (e.g., extend through an opening on) the cover 26 of each of the third dispenser 20C and the fourth dispenser 20D to facilitate selection of the concentrated product that would be aspirated into a diluent. Such embodiments permit compact packaging, by coupling a single reservoir to multiple product reservoirs.

A diluent (e.g. water) from a diluent source (not shown) can be passed through an aspirator line 58. The aspirator line 58 is illustrated in FIG. 2 as a flow passage defined about a longitudinal axis 50 of the dispenser system 10. The series connection of the dispensers permits defining a manifold 60, encompassing each of the dispensers such that the diluent flows in series through each dispenser. Referring back to FIG. 1, the concentrated product can be drawn (e.g., from the product reservoir) into the aspirator line 58 so as to contact the diluent and mixed therewith to generate the use solution. A hose 62 may be operatively connected to a dispensing end 64 of each dispenser to supply the use solution to a desired container 40 (e.g., spray bottle, buckets, and the like).

Each dispenser can include a valve housed therewithin. In FIG. 2, the first dispenser 20A is shown with its cover 26 open, and portions of the first valve 70A are visible. Various types of valves are contemplated, including, but not limited to ball check valves, magnetically actuated valves, pilot valves, and electronically actuable solenoid valves. Each valve can be actuated by an actuation member 72. In the illustrated embodiment, the actuation member 72 is a knob 74 operatively coupled to a push button 76 received in an aperture on the valve body portion which can be depressed to actuate (e.g., mechanically, or using an electronic actuation, such as switches) the valve.

In some embodiments, each valve can control the diluent input into an aspirator (not shown) fluidly coupled to the valve. The aspirator can draw the concentrated product and diluent by venturi effect, thereby mixing them and forming the use solution. A solution outlet of the aspirator can be fluidly coupled (e.g., via hoses and/or other fluid connectors) to the solution container 40, such that the use solution flows through the aspirator and into the solution container 40. As is apparent, the dispenser system 10 is connected such that the valves may be connected in series so as to permit passage of the diluent sequentially therethrough (e.g., flowing through each of the valves of the first dispenser 20A, the second dispenser 20B, the third dispenser 20C and the fourth dispenser 20D in sequence). Such embodiments permit one or more solution containers to be successively filled with the use solution.

Figure 3A:
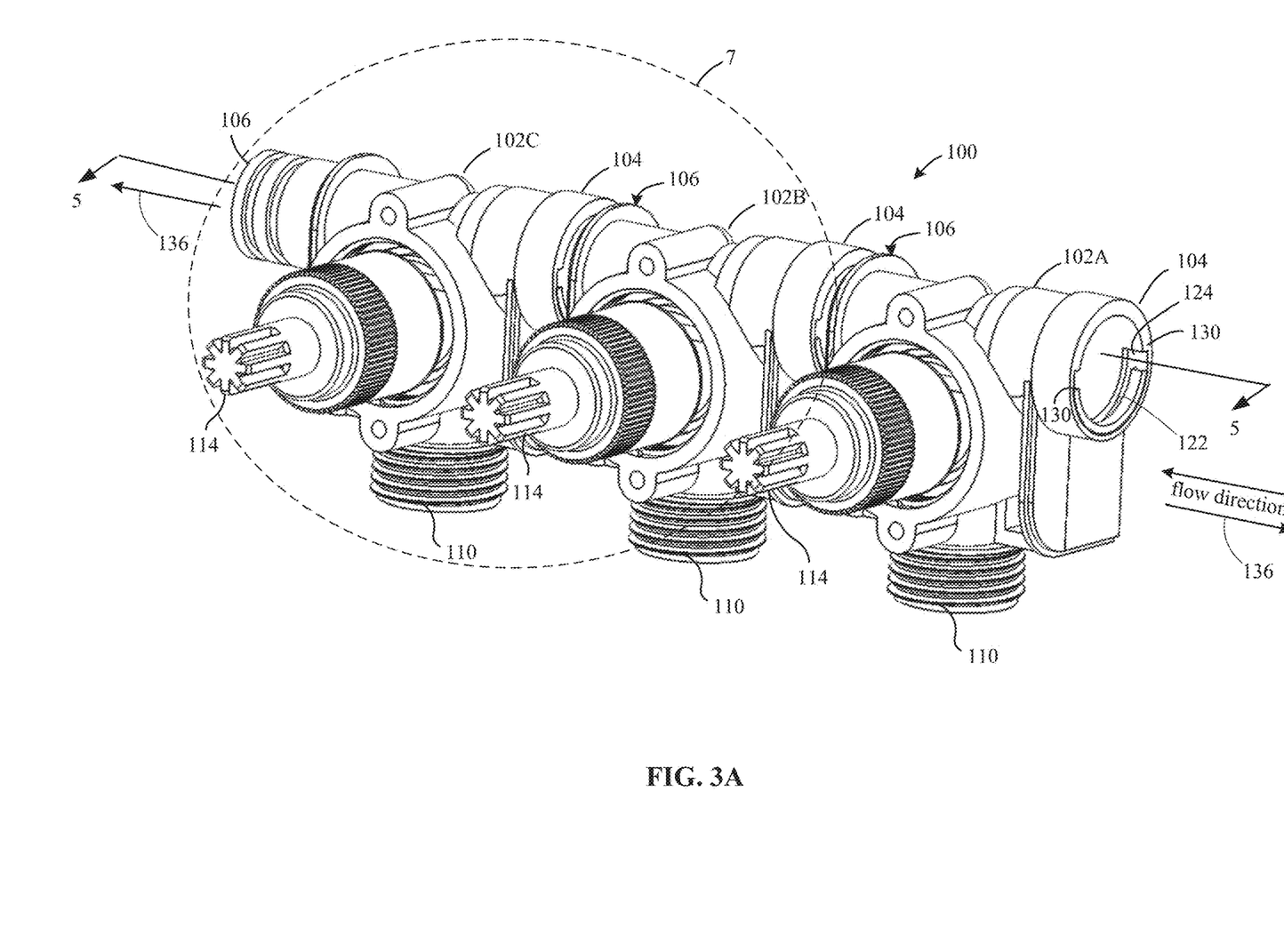
FIG. 3A is a perspective view of a valve assembly connected in series according to an embodiment.

FIG. 3A is a perspective view of a valve assembly 100 according to an embodiment. The valve assembly 100 comprises three valves, a first valve 102A, a second valve 102B and a third valve 102C connected in series. Additional or fewer valves are contemplated within the scope of the present disclosure. The valve assembly 100 as shown in FIG. 3A can be used in a dispenser system 10 such as the one illustrated in FIGS. 1-2. Such valve assemblies can be referred to as a manifold valve assembly 100, permitting passage of a common fluid (e.g., diluent) therethrough when connected in series toward individual aspirators to mix different and/or distinct concentrated products and dispense them to a solution container.

Figure 4:
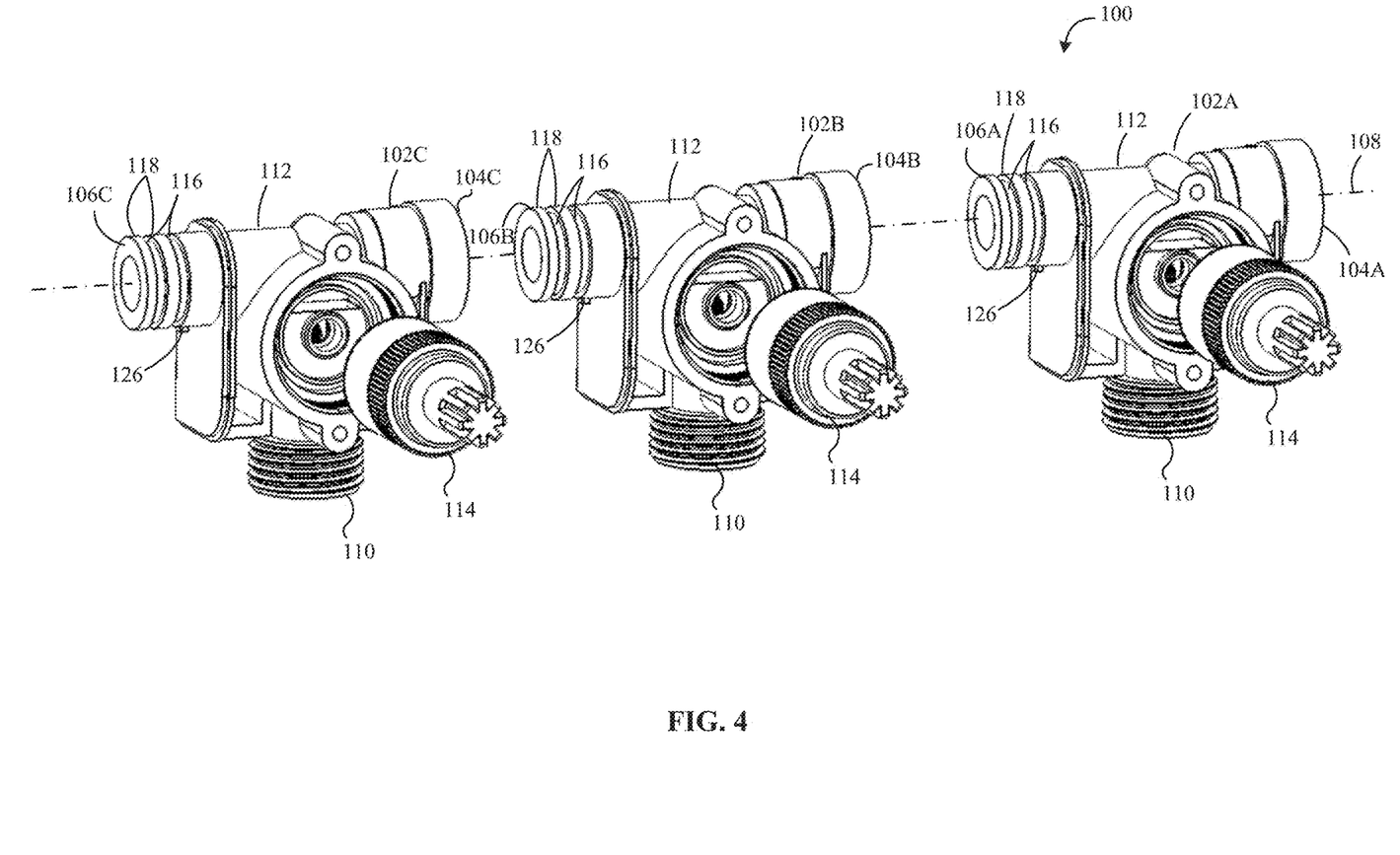
FIG. 4 is an exploded perspective view of the valve assembly of FIG. 3A.

FIG. 4 is an exploded perspective view of the valve assembly 100 of FIG. 3A. As seen therein, each of the first valve 102A, the second valve 102B and the third valve 102C have an inlet port 104 and an outlet port 106 coaxially disposed about a longitudinal axis 108. A common fluid (e.g., a diluent from the aspirator line 58 shown in FIG. 1) can flow through each of the valves when connected in series. As used herein, the series connection refers to a connection whereby the inlet port 104 of the second valve 102B is connected with the outlet port 106 of the first valve 102A, and the inlet port 104 of the third valve 102C is connected with the outlet port 106 of the second valve 102B.

As described previously, the valve assembly 100 shown in FIGS. 3 and 4 can be used with the dispenser system 10 illustrated in FIGS. 1-2. Returning to FIG. 4, in such examples, each of the first valve 102A, the second valve 102B, and the third valve 102C can include a fill port 110 fluidly connectable to a solution container (such as solution container 40 illustrated in FIG. 1). A use solution (e.g., mixture of a concentrated product and diluent) can be supplied from an aspirator fluidly coupled to the fill port 110 and into the fill container (e.g., a spray bottle or a bucket). In such cases, returning to FIG. 4, the flow of use solution can be controlled by each of the first valve 102A, the second valve 102B, and the third valve 102C. For instance, in one example, a body portion 112 of each valve comprises an actuation member 114 connected thereto for actuation of the valve so as to control the supply of use solution. Optionally, once the actuation member 114 is actuated, a venturi effect may be initiated by which the concentrated product is drawn toward an aspiration line and/or a manifold. While a mechanical actuation member 114 (e.g., a knob and push button received in an aperture) is illustrated in FIG. 4, other types of valve actuation (e.g., magnetic, electronic, automated) are contemplated within the scope of the present disclosure.

Figure 5:
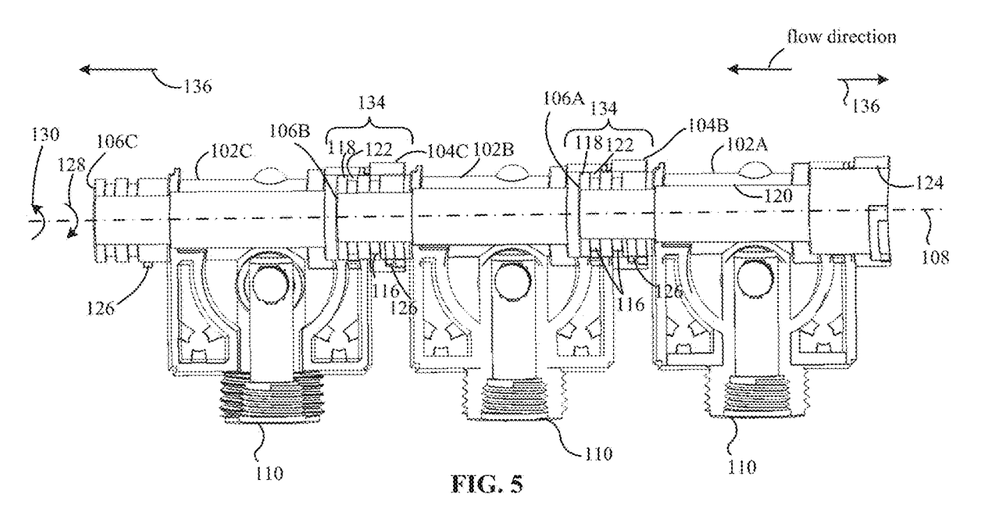
FIG. 5 is a sectional view of the valve assembly of FIG. 3A, taken along the plane 5-5.

As seen in the illustrated embodiment of FIG. 5, while the inlet port 104 and outlet port 106 of each of the first valve 102A, the second valve 102B and the third valve 102C are coaxial about the longitudinal axis 108, their respective fill ports 110 are disposed in a direction perpendicular to the longitudinal axis 108. Each of the first valve 102A, the second valve 102B, and the third valve 102C can be independently actuable so as to respectively direct the common fluid (e.g., diluent) through their respective fill ports into the solution container.

Figure 7:
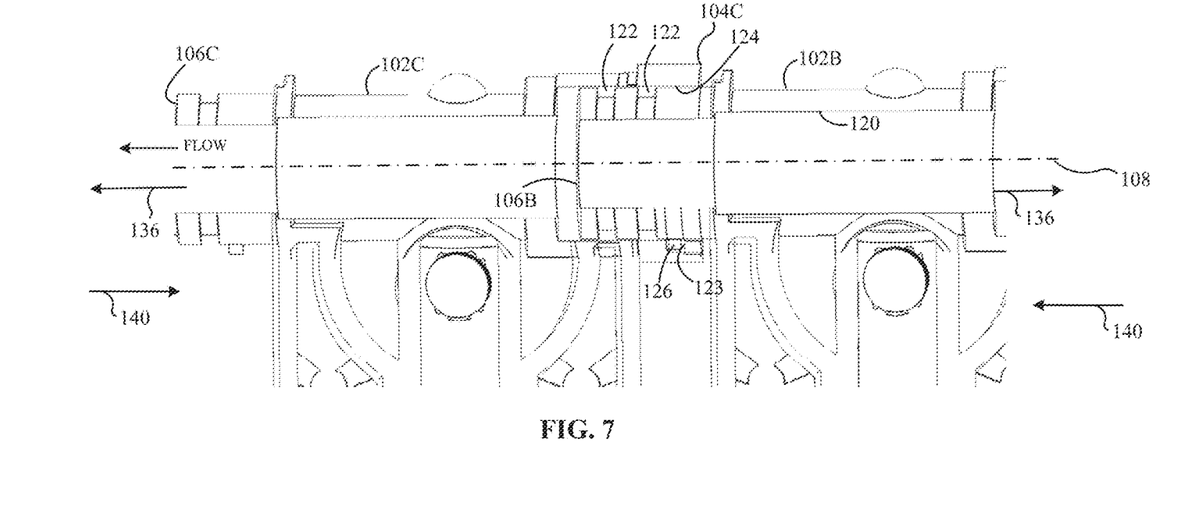
FIG. 7 is an enlarged sectional view of a portion 7 shown in FIG. 5.
Figure 8:
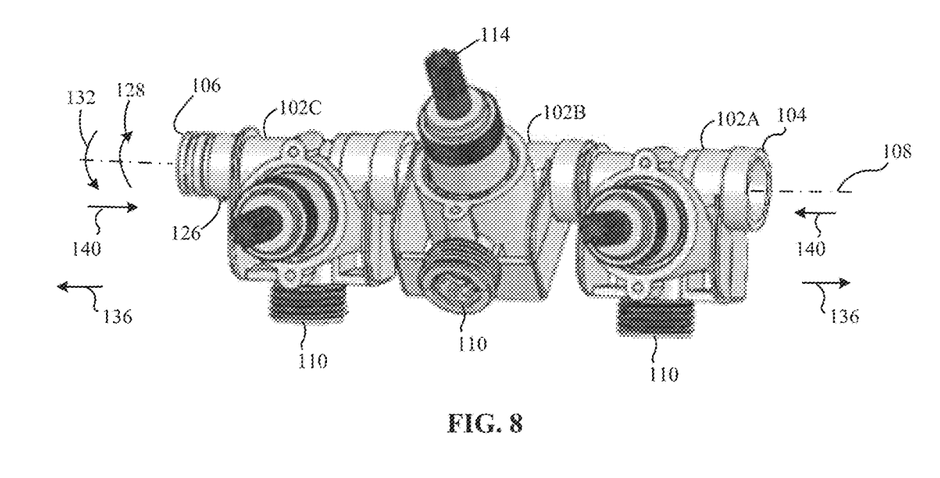
FIG. 8 is a perspective view showing the second valve in a configuration suitable for its removal from the valve assembly.

Referring now to the cross-sectional view of FIG. 5, an exemplary embodiment of a series connection of valves 102A, 102B, 102C is illustrated. In the illustrated embodiment, the valves 102A, 102B, 102C are connected by a modified bayonet connection described further below, although other types of connections permitting tool-less and non-sequential removal, such as other rotational connections are also contemplated within the scope of the present disclosure. In the embodiment illustrated in FIG. 5, the valves 102A, 102B, 102C are connected in series such that the outlet port 106 of an upstream valve is received within the body portion (proximal to the inlet port 104) of a downstream valve. For instance, if the flow direction is along the arrow specified in FIG. 5, the first valve 102A is upstream of the second valve 102B and the third valve 102C, and the second valve 102B is upstream of the third valve 102C. The series connection is established by receiving the outlet port 106A of the first valve 102A within the body portion and proximate to the inlet port 104B of the second valve 102B. Similarly, the outlet port 106B of the second valve 102B is received within the body portion and proximate to the inlet port 104C of the third valve 102C. Successive downstream series connections can be established by connecting additional valves to the outlet port 106C of the third valve 102C. Further, successive upstream series connections can be established by connecting additional valves to the inlet port 104A of the first valve 102A. As used herein, "connection" may refer to both direct and indirect connections, though, direct connections are illustrated in FIGS. 3A, 5 and 7.

Referring again to FIG. 4, each of the first valve 102A, the second valve 102B and the third valve 102C has a body portion 112. When connected in series, the outlet port 106 of a valve is housed within the body portion 112 of an adjacent valve. The body portion 112 can include hollow passageways that form a manifold, and can be of a cross-sectional area sufficient to receive the outlet port 106 of an adjacent valve. For instance, the outlet port 106 of each valve can include a non-uniform outer cross-section, having uniformly-spaced recesses 116 alternating between uniformly-shaped protrusions 118. The hollow passageway of the body portion 112 of each valve, as seen in FIG. 5, can accordingly be of a cross-section to sufficient to receive at least the protrusions 118 of the outlet port 106 of each valve. Alternatively, instead of protrusions and recesses, the outlet port 106 can include threads. In such cases, the hollow passageway of the body portion 112 can include complementary threads to receive the threads of the outlet port 106. Such embodiments permit the series connection to be secure, so that the outlet port 106 of a valve may be fitted snugly within the body portion 112 of an adjacent valve so as to reduce the chances of fluid leakage.

Referring now to FIG. 5, the valve assembly 100 includes a manifold 120 through which the common fluid is permitted to flow, for instance, when the first valve 102A, the second valve 102B and the third valve 102C are connected in series with each other. As mentioned above, the manifold 120 can correspond to an aspiration line through which a diluent (e.g., water) can flow. The manifold 120 can comprise the inlet port 104, at least a part of the body portion 112 (e.g., the hollow passageway formed therein), and the outlet port 106 of each of the first valve 102A, the second valve 102B and the third valve 102C. The manifold 120 can be elongate in shape and is disposed about the longitudinal axis 108.

Continuing with the example illustrated in FIG. 5, the valves can be locked with each other into a series connection. In some such examples, the connection between the valves can be detachable/disconnectable. Further, in some such examples, the valves can be connected with each other in a tool-less manner. In one example, the valves can be connected according to a modified bayonet connection. For instance, each of the first valve 102A, the second valve 102B and the third valve 102C comprises a slot 122 extending over a portion of an inner perimeter of the inlet port 104.

Figure 3B:
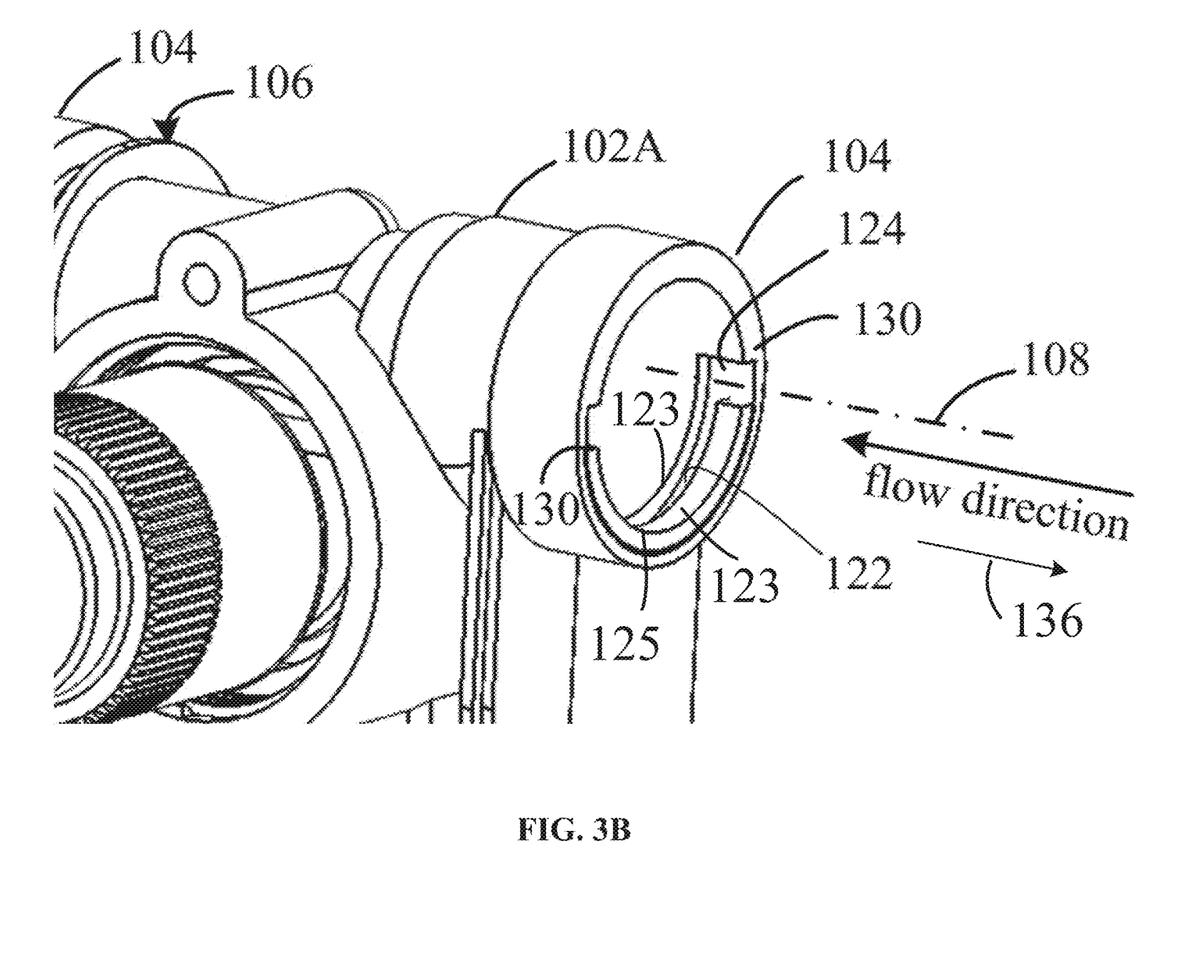
FIG. 3B is an enlarged side-perspective view of a representative valve of the valve assembly shown in FIG. 3A.

FIG. 3B illustrates an enlarged side view of a representative inlet port 104. In the illustrated embodiment, the inlet port 104 has a generally circular cross-section (about the longitudinal axis 108). In such examples, the slot 122 can extend between about 20% and about 70% of an inner circumference 124 of the inlet port 104. As seen in the enlarged side view of FIG. 3B, the slot 122 is generally circular in cross-section and is defined between interior walls 123 of the manifold 120. The cross-sectional area of the slot 122 can be generally greater than the cross-sectional area defined by the interior walls 123 of the manifold 120. Further, the slot 122 is defined inwardly offset from the outer edge 125 of the inlet port 104 along the longitudinal axis 108. The slot 122 terminates in a pair of grooves, which will be described further below.

Referring again to FIG. 5, each of the first valve 102A, the second valve 102B and the third valve 102C comprises a pin 126 extending in a direction perpendicular to the longitudinal axis 108. The pin 126 of the third valve 102C is best seen in the side view of FIG. 6. Referring back to FIG. 5, the pin 126 of each of the first valve 102A, the second valve 102B and the third valve 102C is positioned proximal to their respective outlet ports. Each valve can be locked with an adjacent downstream valve by receiving the pin 126 of a valve into the slot 122 of an adjacent downstream valve. For instance, the pin 126 of the first valve 102A can be received in the slot 122 of the second valve 102B, and the pin 126 of the second valve 102B can be received in the slot 122 of the third valve 102C.

As indicated above, the slot 122 extends peripherally over a portion of the inner circumference 124 of the inlet portion. As such, the first valve 102A can be rotated with respect to the second valve 102B in a first rotational direction 128 about the longitudinal axis 108, such that the pin 126 of the first valve 102A aligns with and is seated in a groove 130 of the second valve 102B. The first valve can then be slid along a second rotational direction 132 and received securely in the slot 122.

Referring back to FIG. 3A, each inlet port 104 has one or more grooves 130 at the ends of the slot 122 to facilitate insertion of the pin 126 into the slot 122. In the illustrated embodiment two grooves 130 positioned about 180 degrees apart are provided on each inlet port 104. However, additional or fewer grooves 130 at other circumferential position of the inlet port 104 are contemplated within the scope of the present disclosure. Further, the grooves 130 can be provided on a plane containing the longitudinal axis 108 and therefore perpendicular to the plane containing the pin 126. Accordingly, to seat a pin 126 of a valve in the groove 130 of an adjacent valve, a valve may be rotated relative to the adjacent valve to align the pin 126 with the groove 130. As is apparent to one skilled in the art, the grooves 130 on the inlet port 104 increase the cross-sectional area available for the insertion of a pin 126 of an adjacent valve.

Figure 6:
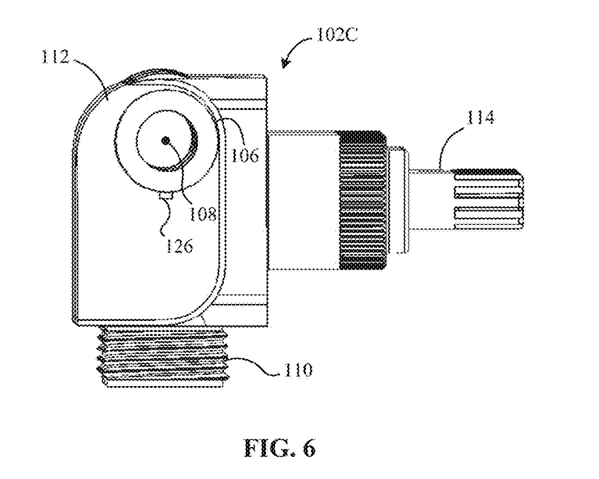
FIG. 6 is a side view of the valve assembly of FIG. 3A.

With continued reference to FIG. 3A, and referring now to the enlarged cross-sectional view of FIG. 6, the pin 126 can be seated on the grooves 130 by rotating the valve so as to bring the pin 126 of a valve (e.g., first valve 102A) in proximity to the groove of an adjacent valve (e.g., second valve 102B). Further, the valve can be inwardly pushed toward the adjacent valve to seat the pin 126 in the groove 130 so as to be received in the slot 122. Once the pin 126 is seated in the groove 130, the valve can be rotated in a second rotational direction 132 such that the pin 126 traverses a path along the slot 122 defined in the inner circumference 124 of the inlet port 104 of the adjacent downstream valve. As the valve is rotated into engagement with an adjacent valve, the uniformly spaced recesses 116 and the protrusion 118 are received within the body portion 112 of an adjacent valve. The rotation of the valve in the second rotational direction 132 is stopped when its fill port 110 is disposed on a plane generally parallel to the plane of the fill port 110 of the remaining valves (e.g., second valve 102B and third valve 102C).

In some examples, the rotation of the valve in the second rotational direction 132 is performed until at least one-quarter of the total length of the valve is received within the body portion 112 of an adjacent valve. Accordingly, when connected, the body portions 112 of two adjacent valves overlap over an overlap portion 134. Alternatively, the rotation of the valve in the second rotational direction 132 is performed for a sufficient number of rotations. For instance, between about one-eighth and about one-half turn, corresponding to between about 45 degrees and about 180 degrees of rotation is performed. When inserted within the body portion 112 of an adjacent valve, the recesses 116 and protrusions 118 are received within the manifold 120 so as to form a secure connection.

Certain embodiments advantageously allow a valve (e.g., second valve 102B) positioned between two valves (e.g., first valve 102A and third valve 102C) to be removed therefrom without removing either of valves to which it is connected. Thus, non-sequential disassembly (and assembly) of the valve connections can be performed, as will be described further below.

Referring again to FIG. 5, as indicated previously, the manifold 120 formed by the series connection of valves permits flow of a common fluid (e.g., diluent) therethrough. The common fluid can have a fluid pressure associated therewith when flowing through the manifold 120. In certain exemplary embodiments, the fluid pressure associated with the flow of common fluid through the manifold 120 can generate a tension force 136 for pushing the each of the valves apart in a direction parallel to the longitudinal axis 108. For instance, the fluid pressure of the common fluid acts in the direction shown by the arrow 136 when the flow of common fluid is along the direction shown by the arrow, thereby generating a tension force 136. Accordingly, the first valve 102A, the second valve 102B, and the third valve 102C are each held axially in tension with respect to each other. The axial tension generated by the fluid pressure can act to retain the pin 126 of a valve (e.g., first valve 102A) in the slot 122 of an adjacent valve (e.g., second valve 102B), and to provide a secure connection. Each valve can thus be locked into a series connection.

For instance, as seen by the enlarged sectional view of FIG. 7, when the common fluid is supplied through the manifold 120, the tension force 136 pulls the valves apart in opposite directions. As a result, the pin 126 can abut against interior wall 123 that bounds the slot 122, and can thereby be prevented from sliding out of the slot 122.

Some such example embodiments can advantageously provide tool-free and/or non-sequential assembly and/or removal of a valve from the valve assembly 100. For instance, the second valve 102B can be disconnected from the series connection without removing either of the first valve 102A and the third valve 102C. In some cases, every valve connected to two adjacent valves can be removed without removal of either one of the adjacent valves to which it is connected. Such embodiments can permit a modular connection and quick removal and replacement of valves in a series connection.

FIG. 7 illustrates one such exemplary embodiment of removing a valve locked into a series connection of three valves. As described previously the valves are locked into series connection by engagement of the pin 126 proximal to the outlet port 106 of a valve and the slot 122 proximal to the inlet port 104 of an adjacent valve. A common fluid flowing through the manifold 120 further holds the valves in tension. Accordingly, to remove a valve from the series connection, the flow of common fluid can be shut off. For instance, if the common fluid is a diluent flowing from a source through external fluid lines (e.g., a hose), it can be shut off by fluidly disconnecting the valve assembly 100 from the external fluid lines. This may involve physically removing the external fluid line, or by using a shut-off valve, or other similar methods.

Once the flow of the common fluid through the manifold 120 is stopped, the tension force 136 associated with the fluid pressure that pushes the valves apart is released. The absence of tension force 136 may permit the valves to be slidable relative to each other. Further, the pin 126 may no longer abut against the interior wall 123, and may have a limited clearance therewith. The valves can therefore be compressed toward each other, for instance, by exerting a compression force 140. As is apparent, the compression force 140 acts in a direction opposite to the tension force 136. The compression force 140 may permit releasing the pin 126 of the valve from the slot 122 of an adjacent valve. Further, the valve to be removed can be rotated along the first rotational direction 128, which may cause the pin 126 to travel in a direction along the slot 122 defined on the inner circumference 124 of the inlet port 104 toward the outer edge 125 of the inlet port 104, after which the valve can be removed from one or more adjacent valves to which it is connected. In some such embodiments, the valve can be rotated between about one-eighth and about one-half of a turn, corresponding to between about 45 degrees and about 180 degrees of rotation to remove the valve from the adjacent valves.

Once repaired or a new valve is available for replacement, a repaired or replacement valve can be installed in accordance with exemplary method of installing a valve in a series of valves. In this example, the first valve 102A is repaired or replaced. Accordingly, the outlet port 106A of the first valve 102A is brought into proximity with the inlet port 104B of the second valve 102B. The pin 126 of the first valve 102A is placed proximal to the slot 122 of the second valve 102B. The pin 126 is inserted through grooves 130, and the first valve 102A is rotated so as to receive the pin 126 of the first valve 102A in the slot 122 of the second valve 102B. The common fluid is supplied through the manifold 120, having a fluid pressure associated therewith when flowing through the manifold 120. As a result, a tension force 136 associated with the fluid pressure is generated that pushes the first valve 102A and the second valve 102B apart in a direction parallel to the longitudinal axis 108. The pin 126 abuts against the interior walls 123 of the slot 122 and is prevented from disengaging with the slot 122, as a result of which, the first valve 102A is connected in a series connection with the second valve 102B. Similar methods can also be used to connect the second valve 102B with the first valve 102A and the third valve 102C, and the third valve 102C with subsequent downstream valves.

Embodiments of the present disclosure provide one or more advantages. Non-sequential assembly and disassembly of manifold valves in a series connection as disclosed herein facilitates quick and easy removal and/or replacement of a defective valve in the series. As a result, if a valve in a series connection (e.g., in dispenser systems) malfunctions, the end user is encouraged to continue using the dispenser system while easily replacing the defective valve. Such embodiments also reduce lead time in replacing a defective component, and promote tool-free assembly and disassembly. Further, embodiments according to the present disclosure also provide a secure connection of valves in series, thereby reducing the chances of leaks.

Various examples have been described. These and other examples are within the scope of the following claims.

The invention claimed is:

1. A valve assembly, comprising:
two or more valves connectable in series according to a series connection, the two or more valves comprising a first valve, a second valve, and a third valve, each of the first valve and the second valve having an inlet port, a body portion and an outlet port, the inlet port and the outlet port of each valve being coaxially disposed about an axis, the series connection being defined such that the inlet port of the first valve is connected with the outlet port of the second valve, the first valve and the second valve when connected forming a manifold, the manifold permitting passage of a common fluid therethrough when the first valve and the second valve are connected with each other according to the series connection, the third valve being connectable downstream of the first valve and the second valve according to the series connection, the third valve comprising an inlet port and an outlet port such that the inlet port of the third valve is connectable to the outlet port of the second valve;
the inlet and outlet ports of each of the first valve, the second valve, and the third valve having connectors that, when interconnected in the series connection, form a modified bayonet connection, the modified bayonet connection permitting removal of the second valve from the series connection with the first valve and the third valve without first removing either of the first valve and the third valve, the modified bayonet connection having two conditions, a locked condition and a detachable condition, the locked condition locking out the ability to disconnect the connectors forming the modified bayonet connection, the detachable condition permitting disconnection of the connectors forming the modified bayonet connection thereby disconnecting the series connection; and
the modified bayonet connection being configured to undergo a tension force resulting from a fluid pressure from the common fluid passing through the manifold, the tension force pushing the connectors of the modified bayonet connection apart in a direction parallel to the axis that holds the modified bayonet connection in the locked condition, the modified bayonet connection being in the locked condition when the common fluid is flowing through the manifold, the modified bayonet connection being in the detachable condition when the common fluid stops flowing through the manifold.

2. The valve assembly of claim 1, wherein each of the first valve and the second valve comprises a slot extending over a portion of an inner perimeter of the inlet port.

3. The valve assembly of claim 2, wherein each of the first valve and the second valve comprises a pin extending in a direction perpendicular to the axis.

4. The valve assembly of claim 3, wherein the pin of each of the first valve and the second valve is positioned proximal to the outlet port of each of the first valve and the second valve respectively.

5. The valve assembly of claim 4, wherein the first valve is lockable with the second valve when the pin of the first valve is received in the slot of the second valve.

6. The valve assembly of claim 5, wherein the first valve is lockable with the second valve when the first valve is rotated with respect to the second valve in a first rotational direction about the axis, wherein, the pin of the first valve is slid into the second valve along a second rotational direction opposite to the first rotational direction.

7. A method of installing a series of valves connectable in series according to a series connection, comprising:
providing a valve assembly, comprising:
a first valve, a second valve, and a third valve, each of the first valve and the second valve having an inlet port, a body portion and an outlet port, the inlet port and outlet port being coaxially disposed about an axis,
a manifold formed when the first valve and the second valve are connected, the manifold being disposed about the axis, the manifold permitting passage of a common fluid therethrough when the first valve and the second valve are connected with each other in series according to a series connection;
the third valve being connectable downstream of the first valve and the second valve according to the series connection, the third valve comprising an inlet port and an outlet port such that the inlet port of the third valve is connectable to the outlet port of the second valve; and
the inlet and outlet ports of each of the first valve, the second valve, and the third valve having connectors that, when interconnected in a series connection, form a modified bayonet connection, the modified bayonet connection permitting removal of the second valve from the series connection with the first valve and the third valve without first removing either of the first valve and the third valve, the modified bayonet connection having two conditions, a locked condition and a detachable condition, the locked condition locking out the ability to disconnect the connectors forming the modified bayonet connection, the detachable condition permitting disconnection of the connectors forming the modified bayonet connection thereby disconnecting the series connection;
connecting the outlet port of the first valve with the inlet port of the second valve;
connecting the outlet port of the second valve with the inlet port of the third valve;
supplying the common fluid through the manifold, the modified bayonet connection being configured to undergo a tension force resulting from a fluid pressure from the common fluid passing through the manifold, the tension force pushing the connectors of the modified bayonet connection apart in a direction parallel to the axis that holds the modified bayonet connection in the locked condition, the modified bayonet connection being in the locked condition when the common fluid is flowing through the manifold, the modified bayonet connection being in the detachable condition when the common fluid stops flowing through the manifold.

8. The method of claim 7, wherein each of the first valve and the second valve comprises
- a slot extending over a portion of an inner perimeter of the inlet port, and
- a pin extending in a direction perpendicular to the axis.

9. The method of claim 8, further comprising:
- positioning the pin of the first valve proximal to the outlet port of the second valve,
- receiving the pin of the first valve in the slot of the second valve, and
- rotating at least one of the first valve and the second valve with respect to each other.

10. A method of removing a valve from a series of valves, comprising:
- providing a valve assembly, comprising:
  - a first valve, a second valve, and a third valve, each of the first valve and the second valve having an inlet port, a body portion and an outlet port, the inlet port and outlet port being coaxially disposed about an axis, the first valve and the second valve are connected in series such that the outlet port of the first valve is connected with the inlet port of the second valve,
  - the first valve and the second valve, when connected, forming a manifold disposed about the axis, the manifold permitting passage of a common fluid therethrough when the first valve and the second valve are connected with each other;
  - the third valve being connectable downstream of the first valve and the second valve according to the series connection, the third valve comprising an inlet port and an outlet port, such that the inlet port of the third valve is connectable to the outlet port of the second valve, the second valve and the third valve are connected in series such that the outlet port of the second valve is connected with the inlet port of the third valve;
  - the inlet and outlet ports of each of the first valve, the second valve, and the third valve, when interconnected in the series connection, forming a modified bayonet connection, the modified bayonet connection permitting removal of the second valve from the series connection with the first valve and the third valve without first removing either of the first valve and the third valve, the modified bayonet connection having two conditions, a locked condition and a detachable condition, the locked condition locking out the ability to disconnect the modified bayonet connection, the detachable condition permitting disconnection of the modified bayonet connection thereby disconnecting the series connection; and
- the modified bayonet connection being configured to undergo a tension force resulting from a fluid pressure from the common fluid flowing through the manifold, stopping flow of the common fluid through the manifold thereby releasing the tension force in the modified bayonet connection, the tension force pushing the modified bayonet connection apart in a direction parallel to the axis that holds the modified bayonet connection in the locked condition, the modified bayonet connection being in the locked condition when the common fluid is flowing through the manifold, the modified bayonet connection being in the detachable condition when the common fluid stops flowing through the manifold;
- compressing the first valve and the second valve toward each other;
- rotating one of the first valve and the second valve with respect to each other about the axis; and
- removing the connection between the first valve and the second valve.

11. The method of claim 10, further comprising:
- removing the second valve from each of the first valve and the third valve without removing either of the first valve and the third valve.

* * * * *